United States Patent [19]
Kotani et al.

[11] Patent Number: 5,629,067
[45] Date of Patent: May 13, 1997

[54] CERAMIC HONEYCOMB STRUCTURE WITH GROOVES AND OUTER COATING, PROCESS OF PRODUCING THE SAME, AND COATING MATERIAL USED IN THE HONEYCOMB STRUCTURE

[75] Inventors: Wataru Kotani, Nagoya; Kunikazu Hamaguchi, Kasugai; Yoshiyuki Kasai, Nagoya, all of Japan

[73] Assignee: NGK Insulators, Ltd., Japan

[21] Appl. No.: 8,313

[22] Filed: Jan. 25, 1993

[30] Foreign Application Priority Data

Jan. 30, 1992 [JP] Japan ................................ 4-40103
Dec. 9, 1992 [JP] Japan ................................ 4-351934

[51] Int. Cl.$^6$ ............................................ B32B 3/00
[52] U.S. Cl. .................. 428/116; 428/117; 428/119; 428/188; 502/439; 502/527; 422/177; 422/180
[58] Field of Search ............... 428/116, 188, 428/119, 117; 502/439, 527; 422/177, 180

[56] References Cited

U.S. PATENT DOCUMENTS

| | | | |
|---|---|---|---|
| 3,983,283 | 9/1976 | Bagley | 428/116 |
| 4,335,023 | 6/1982 | Dettbing | 428/116 |
| 4,451,517 | 5/1984 | Inoguchi | 428/116 |
| 4,455,336 | 6/1984 | Ogawa | 428/116 |
| 4,756,976 | 7/1988 | Komeya | 428/116 |
| 4,840,827 | 6/1989 | Mizutani | 428/116 |
| 4,869,944 | 9/1989 | Harada | 428/116 |
| 4,877,670 | 10/1989 | Hamanaka | 428/116 |
| 5,063,029 | 11/1991 | Mizuno | 428/116 |
| 5,073,432 | 12/1991 | Horikawa | 428/116 |
| 5,188,779 | 2/1993 | Horikawa | 428/116 |
| 5,207,989 | 5/1993 | MacNeil | 422/180 |
| 5,514,446 | 5/1996 | Machida | 428/116 |

FOREIGN PATENT DOCUMENTS

| | | |
|---|---|---|
| 0449556 | 10/1991 | European Pat. Off. . |
| 53-133860 | 3/1952 | Japan . |
| 50-48858 | of 1975 | Japan . |
| 51-44713 | 11/1976 | Japan . |
| 56-129043 | 10/1981 | Japan . |
| 56-129042 | 10/1981 | Japan . |
| 63-144836 | 9/1988 | Japan . |
| 2-86847 | 3/1990 | Japan . |
| 2071640 | 9/1981 | United Kingdom . |

OTHER PUBLICATIONS

Database WPI, Section Ch, Week 8916, Derwent Publications Ltd., London, GB; Class L02, An 89–119916 & JP-A-1 067 262 (Toto Kagaku Kogyo K Kiriyama Seisakusho KK) 13 Mar. 1989.
Patent Abstracts of Japan, vol. 013, No. 491 (C–650) 7 Nov. 1989 & JP-A-01 192 764 (Ibiden Co Ltd) 2 Aug. 1989.

*Primary Examiner*—Ellis Robinson
*Assistant Examiner*—Timothy M. Speer
*Attorney, Agent, or Firm*—Parkhurst, Wendel & Burr

[57] ABSTRACT

A ceramic honeycomb structure is disclosed which includes a ceramic honeycomb body having a matrix of partition walls forming a multiplicity of cells extending in an axial direction of the honeycomb body. The radially outermost array of the cells are open to an outside of the honeycomb body in radial directions thereof, to provide a plurality of grooves formed in an outer periphery of the honeycomb body to extend in the axial direction. The honeycomb structure further includes an outer coating which fills at least the grooves to cover the outer periphery of the ceramic honeycomb body, so as to provide an outer surface of the honeycomb structure. Also disclosed are a process of producing such a honeycomb structure, and a coating material used for forming the outer coating as described above.

13 Claims, 1 Drawing Sheet

CERAMIC HONEYCOMB STRUCTURE WITH GROOVES AND OUTER COATING, PROCESS OF PRODUCING THE SAME, AND COATING MATERIAL USED IN THE HONEYCOMB STRUCTURE

BACKGROUND OF THE INVENTION

1. Field of the Invention

The present invention relates generally to a ceramic honeycomb structure, a process of producing the honeycomb structure, and a coating material used in the structure. The invention is particularly concerned with a technique for effectively reinforcing the ceramic honeycomb structure and facilitating production thereof, assuring easy and wide application of the honeycomb structure produced.

2. Discussion of the Prior Art

In recent years, it is under discussion to intensify automobile emission regulations to meet a growing demand for preventing air pollution. At present, a catalytic converter having a ceramic honeycomb structure as a catalyst substrate or support is utilized for purifying automobile exhaust gas or emissions. The ceramic honeycomb structure is formed by extrusion as an integral body with a multiplicity of through-holes or cells defined by honeycomb thin walls. As a measure to further improve the catalytic conversion or purification efficiency of the catalytic converter, it has been proposed to improve a so-called warm-up characteristic of the converter, namely, to enhance the catalytic activity from the beginning of operation of the converter, by reducing the heat capacity of the honeycomb structure and thereby shortening the time required for heating the structure to a sufficiently high operating temperature.

In order to reduce the heat capacity of the ceramic honeycomb structure, there is a need to reduce the weight or bulk or apparent density of the honeycomb structure without changing its geometric surface area. To meet this need, it is proposed to reduce the thickness of the walls or webs defining the cells or to increase the open porosity of the honeycomb structure. As the easiest way to enhance the catalytic conversion efficiency, it is also proposed to increase the area of the honeycomb structure which supports the catalyst, namely, the volume of the honeycomb structure. In the automobile application, however, it is difficult to change the area or space in an automobile for installation of the converter. If a plurality of honeycomb structures are connected in series to thereby increase the total volume of the honeycomb structures, the resistance to flow of exhaust gas from an automobile engine is undesirably increased with a result of a reduced engine power, for example. To improve the catalytic conversion efficiency, therefore, it is preferred to reduce the thickness of the walls partitioning the cells of the honeycomb structure and increase the open porosity of the structure, so as to increase the volume or catalyst-bearing area of the honeycomb catalyst support without increasing the resistance to the exhaust gas flow.

On the other hand, exhaust gases emitted by a diesel engine car are purified in terms of particulates emitted particularly from the diesel engine, as well as NOx, CO, and HC which are also emitted from an ordinary gasoline engine car. In purifying the exhaust gas from the diesel engine, therefore, a diesel particulate filter (DPF) is employed to remove the particulates while the honeycomb structure is employed to remove NOx and others by a three-way catalytic conversion. Since a relatively large amount and high concentration of exhaust gases are emitted by the type of vehicles, such as large-sized buses and trucks, in which diesel engines are installed, a sufficiently large-sized honeycomb structure having an outside diameter of as large as 300 mm is needed to purify the exhaust gases in the manner as described above.

All of the above-described measures to effectively control the exhaust emissions, such as reduced thickness of the honeycomb walls, and lowered bluk of the honeycomb structure due to increased open porosity thereof, result in reduction in the mechanical strength of the honeycomb structure, and thereby cause various problems to the structure. For example, it is extremely difficult to achieve sufficiently reduced thickness of the honeycomb walls from the standpoint of production engineering. Upon extrusion molding of the thin-walled honeycomb structure, the extruding rate or speed of a clay varies depending upon portions of an extrusion die from which the clay is extruded, and an outer peripheral portion of the honeycomb structure (green body) may suffer from distortion or deformation of the cells, or cracks in an outer wall of the structure. The thus extruded honeycomb body has a low mechanical strength and may therefore suffer from breakage or deformation of the cells due to its own weight, which results in lowered dimensional accuracy of the resulting honeycomb product. Since a portion of the honeycomb structure having such defective cells is likely to be broken at the early period of use of the structure, due to the lower mechanical strength thereof compared to the other portions, it is necessary to remove the defects in the cells to assure a sufficiently high strength of the thin-walled honeycomb structure as a whole. Even if the thin-walled honeycomb structure consists of normal cells which do not include distorted or deformed cells of low mechanical strength and has an integrally formed outer wall which is free from cracks, such a honeycomb structure is still unsatisfactory in its isostatic strength (i.e., strength to endure uniform gripping force exerted on the outer wall) when the structure is subjected to canning. This makes it necessary to provide a reinforcing member on the outer wall of the structure.

When the honeycomb structure is large-sized to achieve a diameter of about 300 mm, so as to provide a large-sized catalyst support or DPF, it is difficult to form by molding an outer wall having a uniform thickness as an integral part of the structure. In addition, the extruded green body of the honeycomb structure is poor in its ability to keep its shape due to its considerably low mechanical strength, and suffers from breakage or deformation due to its own weight, resulting in poor dimensional accuracy. In particular, an outer peripheral portion of the honeycomb structure has an extremely low mechanical strength.

In view of the above situations, it is proposed in JP-B2-51-44713 to cover the outer periphery of the honeycomb structure with a mixture of sodium silicate and zirconium silicate, in order to reinforce the structure. For the same purpose, a water-repellent reinforcing refractories may be provided on the outer circumferential surface of the honeycomb structure, as disclosed in Publication No. 50-48858 of unexamined Japanese Utility Model Application (JP-U-50-48858). It is also proposed to provide a glaze coating on the outer circumferential surface of the honeycomb structure, as disclosed in JP-U-53-133860. It is further proposed in JP-A-56-129042 assigned to the assignee of the present application to fill passages or through-holes in an outer peripheral portion of a honeycomb support with a suitable ceramic material, so as to strengthen the outer peripheral portion. In JP-U-63-144836 also assigned to the present assignee, it is proposed to provide a covering layer as reinforcing means on the outer wall of the honeycomb structure so as to compensate for a difference between the actual diameter and an intended diameter of the structure.

However, the known reinforcing means provided on the outer periphery of the honeycomb structure may be unsatisfactory in their reinforcing effects, or may have poor heat-resistance properties. The covering layer indicated just above tends to peel off or form cracks therein, for example. Thus, none of the known honeycomb structures is satisfactory in all terms of its mechanical strength, heat-resistance, thermal shock resistance and operating reliability, to the extent required for the structure to appropriately serve as a honeycomb catalyst support for purifying automobile exhaust gases.

SUMMARY OF THE INVENTION

It is therefore a first object of the present invention to provide a honeycomb structure which is effectively reinforced with an outer coating having an improved resistance to peeling-off, assuring improved heat resistance and thermal shock resistance, and which can be produced with ease, permitting an easy and wide application in practical use.

It is a second object of the invention to provide a process of producing such a honeycomb structure as described above.

It is a third object of the invention to provide a coating material which is suitably used for the outer coating of the honeycomb structure.

The first object may be accomplished according to a first aspect of the present invention, which provides a ceramic honeycomb structure comprising: a ceramic honeycomb body having a matrix of partition walls forming a multiplicity of cells extending in an axial direction of the honeycomb body, a radially outermost array of the multiplicity of cells being open to an outside of the honeycomb body in radial directions thereof, to provide a plurality of grooves formed in an outer periphery of the honeycomb body so as to extend in the axial direction; and an outer coating which fills at least the grooves to cover the outer periphery of the ceramic honeycomb body, so as to provide an outer surface of the honeycomb structure.

In the ceramic honeycomb structure according to the present invention, the ceramic honeycomb body is formed at its outer periphery with axial grooves, which are filled with a coating material for forming the outer coating which gives an outer surface of the honeycomb structure. The thus constructed honeycomb structure is effectively reinforced by the outer coating, without suffering from reduction of the strength during its use due to peeling-off of the coating. Further, the thermal shock resistance of the honeycomb structure is not deteriorated even if the outer coating is provided for reinforcing the honeycomb body.

The present honeycomb structure thus reinforced is free from peeling of the outer coating, crack formation and others, assuring significantly improved heat resistance and thermal shock resistance. The honeycomb structure having such characteristics may be easily produced with effectively enhanced dimensional accuracy, to achieve a desired outside diameter and cylindricity. The thus obtained honeycomb structure is suitably used for a catalytic converter or exhaust gas purifying apparatus.

The second object may be accomplished according to a second aspect of the invention, which provides a process of producing a ceramic honeycomb structure comprising the steps of: (a) preparing a ceramic honeycomb body having a matrix of partition walls forming a multiplicity of cells extending in an axial direction of the honeycomb body, a radially outermost array of the multiplicity of cells being open to an outside of the honeycomb body in radial directions thereof, to provide a plurality of grooves formed in an outer periphery of the honeycomb body to extend in the axial direction; (b) preparing a coating material comprising as major components cordierite particles and/or ceramic fibers, and a colloidal oxide; (c) applying the coating material to the outer periphery of the ceramic honeycomb body to fill the grooves, so as to form an outer coating which gives an outer surface of the honeycomb structure; and (d) drying or firing the outer coating formed on the outer periphery of the ceramic honeycomb body so that the outer coating is secured to the ceramic honeycomb body.

The third object may be accomplished according to a third aspect of the invention, which provides a coating material used for forming an outer coating of a ceramic honeycomb structure, comprising as major components cordierite particles and/or ceramic fibers, and a colloidal oxide.

The coating material including the cordierite particles and/or ceramic fibers as an aggregate and the colloidal oxide as an inorganic binder is advantageously used for forming the outer coating which forms an outer surface of the ceramic honeycomb structure. The honeycomb structure with the thus formed outer coating exhibits an effectively increased isostatic strength and an excellent thermal shock resistance.

BRIEF DESCRIPTION OF THE DRAWINGS

The above and optional objects, features and advantages of the present invention will be better understood by reading the following description of some examples of the invention, when considered in connection with the accompanying drawings, in which.

DETAILED DESCRIPTION OF THE PRESENT INVENTION

The ceramic honeycomb body which constitutes the ceramic honeycomb structure of the present invention is usually formed using a cordierite ceramic material by extrusion, drying and firing. In producing a large-sized honeycomb body, or a thin-walled honeycomb body having thin walls or webs forming cells, it is difficult to form an outer wall as an integral part of the ceramic body without causing any defects in the outer wall. Namely, the honeycomb body produced suffers from deformation or distortion of the cells in its outer peripheral portion, and from cracks which may occur in the outer wall (outer circumferential surface).

Figure 1:
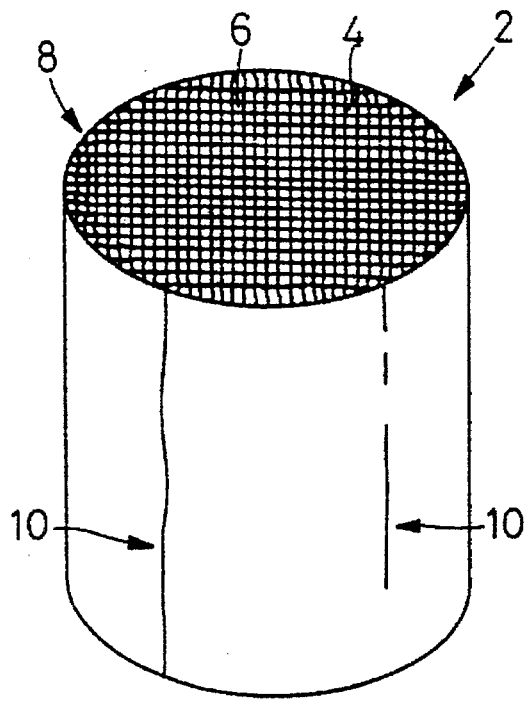
FIG. 1 is a perspective view showing a honeycomb body formed by extrusion, which has distorted cells and cracks in its outer peripheral portion.
Figure 2:
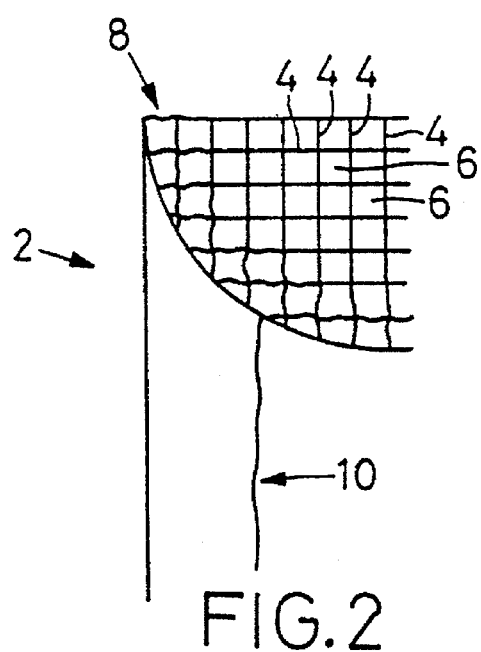
FIG. 2 is a fragmentary enlarged view showing the distorted cells and cracks in the honeycomb body of FIG. 1.

More specifically described referring to FIGS. 1 and 2, a honeycomb body 2, which is integrally formed by extrusion using a cordierite ceramic material, has a matrix of partition walls 4 forming a multiplicity of through-holes or cells 6 whose size is determined depending upon its specific application. In other words, the cells 6 of the honeycomb body 2 are defined or partitioned by the walls 4, and extend from one axial end of the body 2 to the other. As is apparent from FIG. 2, the partition walls 4 in an outer peripheral portion of the honeycomb body 2 are deformed, giving rise to a distorted cell portion 8 in which the cells 6 are distorted or deformed, while some cracks 10 are formed in the outer wall of the honeycomb body 2.

Generally, a three-way catalytic converter or diesel particulate filter (DPF) using a ceramic honeycomb structure is installed on an automobile such that the honeycomb structure provided with a wire mesh wound on its outer circumference is accommodated in a casing. If the honeycomb body 2 having the distorted cell portion 8 and cracks 10 as described above is used as the ceramic honeycomb structure, the honeycomb body 2 will be broken within the casing, due to a compressive force exerted on its outer periphery, and thus fails to serve as a catalytic converter or filter. While the honeycomb body 2 needs to be reinforced, it is no use providing the known reinforcing means on the outer periphery of the honeycomb body 2 with its radially outer portion suffering cracks or defects (e.g., distortion) of the cells, since the breakage takes place upon insertion of the honeycomb body 2 into the casing, at a portion of the body 2 which has the lowest mechanical strength. While the honeycomb body 2 thus reinforced may have an increased mechanical strength at its outer peripheral portion including the reinforcing means, the distorted cell portion 8 provided with no reinforcing means has the lowest mechanical strength, and is therefore most likely to be broken. Thus, providing reinforcing means on the outer periphery of the honeycomb body 2 does not yield sufficient reinforcing effects, in the presence of the cells being distorted or deformed.

While the above phenomenon occurs in the honeycomb body 2 having the distorted cell portion 8, the honeycomb body 2 suffering no distortion of the cells 6 in its outer peripheral portion still suffers from a considerably low mechanical strength (which is represented by the isostatic strength as indicated above) as the thickness of the walls 4 is reduced, making it necessary to reinforce the honeycomb body 2. If a reinforcing layer is provided on the outer periphery of the honeycomb body 2 with its outer wall left as it is, the thickness of the outer wall is inevitably increased, with a result of an increased difference between the thicknesses of the partition walls 4 and the outer wall. As a result, the honeycomb structure is subject to increased thermal stresses when it expands or contracts at a high temperature of exhaust gas during its use, or upon baking of the catalyst on the ceramic support during its manufacture, whereby cracks are likely to be formed in the structure, i.e., the thermal shock resistance is deteriorated. Further, the contact area between the reinforcing layer and the honeycomb body is relatively small if the honeycomb body is reinforced with the reinforcing layer covering or coating the outer wall. Therefore, the reinforcing layer is likely to peel off, and fails to provide a sufficiently high reinforcing effect.

Figure 3:
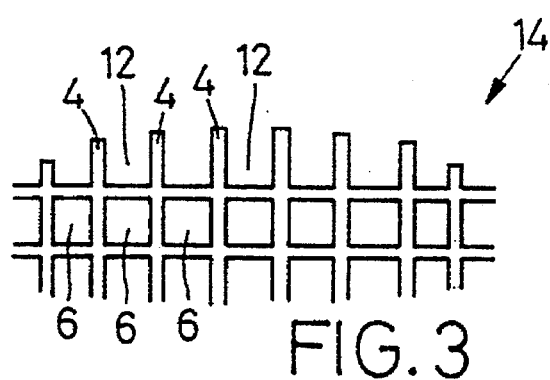
FIG. 3 is an enlarged view showing an outer peripheral portion of a ceramic honeycomb body used in the present invention.

In view of the above, the ceramic honeycomb body of the ceramic honeycomb structure according to the present invention does not have an integrally formed outer wall. Namely, the honeycomb body has a plurality of axial grooves formed at its outer periphery and defined by the partition walls forming the cells. More specifically described referring to FIG. 3, a ceramic honeycomb body 14 has a matrix of thin partition walls 4 forming a multiplicity of cells 6 which extend in the axial direction of the body 14, and a plurality of axial grooves 12 corresponding to a radially outermost array of the cells 6 which are not separated by walls 4 from the outside of the body 14, i.e., which are open to the outside in the radial directions. This honeycomb body 14 with the grooves 12 may be easily produced by grinding the outer peripheral portion of the honeycomb body 2 (FIG. 1) produced by the known extrusion method and having an integral outer wall, until the outer wall and the distorted cell portion are removed from the honeycomb body 2. The honeycomb body 14 may be also formed by extrusion without an outer wall, with its outer peripheral portion being shaped as shown in FIG. 3. In the latter case, it is easy to control the extruding rate for the honeycomb body consisting solely of a relatively uniform honeycombed portion, taking no account of the extruding rate for the outer wall which needs a different amount of material batch from the honeycombed portion. Accordingly, distortion or deformation of the cells in the outer peripheral portion is effectively limited or avoided.

As a result of grinding or controlled extrusion as described above, the ceramic honeycomb body 14 of the present invention does not include distorted cells in its outer peripheral portion, whereby a honeycomb structure using the honeycomb body 14 does not include a portion having an excessively low mechanical strength. Accordingly, the honeycomb structure is given a significantly improved isostatic strength by providing an outer coating 16 (which will be described) on the outer periphery of the honeycomb body 14.

Figure 5:
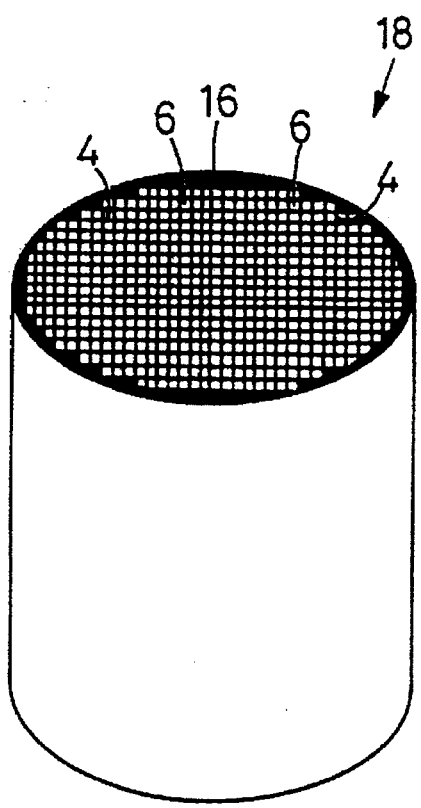
FIG. 5 is a perspective view of one embodiment of a ceramic honeycomb structure of the present invention, in which the ceramic honeycomb body of FIG. 3 has grooves at its outer periphery, which are filled with a coating material which gives the outer coating.
Figure 4:
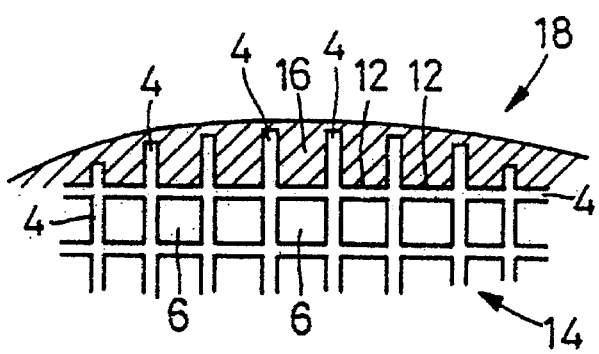
FIG. 4 is a view corresponding to that of FIG. 3, in which an outer coating is formed on the outer periphery of the ceramic honeycomb body of FIG. 3.

On the ceramic honeycomb body 14 having the axial grooves 12 on its outer periphery, the outer coating 16 having a suitable thickness is formed such that at least the grooves 12 are filled with a reinforcing coating material which gives the coating 16, whereby an intended ceramic honeycomb structure is obtained which is reinforced at its outer periphery. Namely, a suitable coating material is applied to the outer peripheral portion of the honeycomb body 14 as shown in FIG. 3, so as to fill at least the axial grooves 12 which are open to the outside, as shown in FIGS. 4 and 5, to thereby provide a ceramic honeycomb structure 18 having the outer coating 16 as its outer wall. The honeycomb structure 18 whose outer surface is provided by the coating 16 has a suitably controlled outer diameter and cylindricity, and assures an effectively improved isostatic strength.

In the thus obtained ceramic honeycomb structure 18, a relatively large contact area is achieved between the outer coating 16 and honeycomb body 14, since the axial grooves 12 are formed in the outer periphery of the honeycomb body 14. This effectively prevents or inhibits peeling-off of the outer coating 16 from the honeycomb body 14. In addition, the honeycomb body 14 does not have an integrally formed outer wall, and thus may be formed with a relatively thin outer wall given by the outer coating 16, while assuring a similarly high degree of mechanical strength as the known honeycomb body with a reinforcing layer formed on its integral outer wall. In this case, the difference in the thicknesses of the honeycomb partition walls 4 and the outer wall (outer coating) 16 can be advantageously reduced, thereby alleviating the thermal stresses which occur between the outer wall 16 and the honeycomb body 14, and making the honeycomb structure 18 highly resistant to thermal shock.

Although the thermal expansion and contraction of the reinforcing coating material applied to the honeycomb body 14 are generally greater than those of the honeycomb body 14, such expansion and contraction may be effectively alleviated by the partition walls 4 which define the axial grooves 12 and the cells 6, resulting in reduction in the strains which occur in the outer wall (16) formed of the coating material. Consequently, the honeycomb structure 18 whose outer surface is provided by the outer coating 16 filling the axial grooves 12 ensures a sufficiently high mechanical strength upon its installation on an automobile, and displays an excellent thermal shock resistance with high reliability during its use.

In the ceramic honeycomb structure 18 constructed as described above, the outer coating 16 which gives the outer wall of the structure 18 is generally formed by using an aggregate and an inorganic binder for bonding the aggregate together. Particularly used as the aggregate is cordierite in the form of particles (sintered powder) which has a small coefficient of thermal expansion and whose crystal phase has not been changed due to its heat history. Thus, the outer coating 16 has a primary crystal phase which consists of cordierite. The cordierite particles are preferably used as the aggreagate for the following reason. Namely, upon heating and cooling of the honeycomb structure, thermal stresses occurring in various portions of the structure are concentrated to the interface between the honeycomb body and outer coating. Such thermal stresses are minimized when the honeycomb body and outer coating have the same degree of thermal expansion. Otherwise the lower thermal expansion of the outer coating is preferred for effectively preventing cracks and other defects in the outer coating (outer wall) due to the thermal stresses. To reduce the thermal expansion of the outer coating, it is effective to reduce the thermal expansion of the aggregate, to be lower than that of a matrix provided by the inorganic binder having a relatively high coefficient of thermal expansion. Accordingly, cordierite having a small coefficient of thermal expansion is favorably used as the aggregate, to thereby reduce the thermal expansion of the outer coating, and make the resultant honeycomb structure highly resistant to thermal stresses.

The cordierite used as the aggregate is generally in the form of a sintered powder having the average particle size of 50 μm or smaller. Preferably, the cordierite powder is a blend of relatively minute particles and relatively coarse particles. For example, the cordierite powder is a mixture of first particles of the average particle size of 15 μm or smaller, and second particles of the average particle size of 30 μm or larger. The cordierite particles may be wholly or partially replaced by ceramic fibers formed of amorphous mullite or amorphous silica alumina, for example. The use of such ceramic fibers is advantageous in avoiding cracks in the outer coating and effectively preventing peeling-off of the coating. The ceramic fibers have a fiber length of 10–15 μm and a fiber diameter of about 2–3 μm.

The aggregate, such as the cordierite particles or ceramic fibers as described above, is bonded together by the above-indicated matrix provided by an inorganic binder which constitutes the outer coating. The matrix is generally an amorphous oxide matrix, which is preferably formed by using colloidal silica or colloidal alumina as the inorganic binder. While known inorganic binders, such as water glass or alumina cement, may be used as the inorganic binder according to the present invention, the use of colloidal silica or colloidal alumina in particular leads to significantly enhanced heat resistance of the outer coating 16 as the outer wall of the honeycomb body 14, and significantly improved thermal shock resistance of the honeycomb structure 18 thus obtained.

When the colloidal oxides, such as colloidal silica or colloidal alumina, are used as the inorganic binder, the outer coating 16 desirably contains 3–35 parts by weight of the solid portion of the colloidal oxides per 100 parts by weight of the cordierite particles and/or ceramic fibers. The colloidal oxides need to be used in a proportion of at least 3 parts so as to provide an adequate strength of the outer coating and appropriately bond the cordierite particles or ceramic fibers together. Too large proportion of the use of the colloidal oxides results in deterioration of the thermal properties of the outer coating, and consequently, those of the honeycomb structure as a whole.

In producing the ceramic honeycomb structure according to the present invention, a coating material is favorably used which contains the above-indicated cordierite particles and/or ceramic fibers and colloidal oxides as major components. The coating material forms the outer coating which gives the outer peripheral portion of the honeycomb structure. To the coating material may be added as needed a suitable aid, such as an organic binder, for adjusting its viscosity, in view of the work efficiency in coating the honeycomb body with the coating material. The thus prepared coating material is applied to the outer periphery of the honeycomb body 14 as shown in FIG. 3, which has the axial grooves 12 formed in the outer periphery according to the invention. The coating material thus applied fill the grooves 12 of the honeycomb body 14, and provide the outer coating 16 having a suitable thickness. The honeycomb body 14 is coated with the coating material by various known coating methods, which include brush coating, dipping, spray coating, flow coating or slushing. The spray coating is carried out with the viscosity of the coating material suitably reduced.

The outer coating 16 thus formed on the outer surface of the honeycomb body 14 is then dried or fired as needed, depending upon the kind of the coating material used, whereby the outer coating 16 is secured to the ceramic honeycomb body 14. In this connection, the honeycomb body 14 may be fired upon the firing of the outer coating 16.

Thus, the present ceramic honeycomb structure 18 is obtained by filling with the coating material at least the axial grooves 12 formed in the outer periphery of the ceramic honeycomb body 14, so as to provide the outer coating (reinforcing layer) 16 which serves as the outer wall that gives the outer surface of the structure 18. The thus obtained honeycomb structure 18 is excellent in its heat resistance and thermal shock resistance, assuring a high strength sufficient for its practical use. Preferably, the honeycomb structure 18 has an isostatic strength of 3 kg/cm² or higher, is resistant to thermal shock of 700° C. or higher, and suffer from cracks at 800° C. or higher. While the honeycomb structure 18 having these properties may be advantageously used as a catalyst support for purifying exhaust gases, the same structure may be favorably used as a diesel particulate filter (DPF) or a rotary heat regenerator, for example.

DETAILED DESCRIPTION OF THE INVENTION

To further clarify the concept of this invention, there will be described some examples of the invention, for illustrative purpose only, to which the present invention is not limited. It is to be understood that the present invention may be embodied with various changes, modifications and improvements made in the illustrated examples, which may occur to those skilled in the art, without departing from the scope of the invention.

EXAMPLE 1

A first group of cordierite honeycomb bodies were prepared, each having an outside diameter of 300 mm, a length of 300 mm, a honeycomb wall thickness of 150 µm, and 62 cells per 1 cm² of cross sectional area, and being formed integrally with an outer circumferential wall. These cordierite honeycomb bodies had distorted cell portions (8) in respective outer peripheral portions, as shown in FIGS. 1 and 2. The distortion or deformation of the cells in the portion (8) was inevitably caused by the weight of the honeycomb body per se having the outside diameter as large as 300 mm. A second group of cordierite honeycomb bodies were prepared each having an outside diameter of 310 mm, a length of 300 mm, a honeycomb wall thickness of 150 µm, and 62 cells per 1 cm² of cross sectional area. Each of these honeycomb bodies had an integrally formed outer wall, and distorted cells in its outer peripheral portion. For each honeycomb body, the outer peripheral portion was ground to eliminate the distorted cells, to thereby provide a 300 mm-diameter honeycomb body (as shown in FIG. 3) having axial grooves (12) which are open on its outer circumferential surface.

On the other hand, coating materials No. 1 through No. 5 were prepared using a cordierite powder A and an inorganic binder A, B or C as indicated in TABLE 1, which were mixed together in the proportions as indicated in TABLE 2. The mixture was kneaded with water, into a paste which can be applied to the ceramic honeycomb body. In this manner, the coating materials Nos. 1–5 having respective compositions as indicated in TABLE 2 were prepared.

group of non-grooved honeycomb bodies each having the integral outer wall and the second group of grooved honeycomb bodies (without outer walls) having axial grooves in their outer peripheral portions. The honeycomb bodies were then exposed to the atmosphere for 24 hours, and dried for two hours at 90° C., to thereby provide various cordierite honeycomb structures provided with respective outer coatings. The thickness of the outer coatings thus formed were in a range of about 0.1–1 mm. Various performance tests were effected to determine the properties of the respective cordierite honeycomb structures with the outer coatings. As a comparative example, there was prepared a cordierite honeycomb structure formed integrally with an outer wall and having an outside diameter of 300 mm, a length of 300 mm, a honeycomb wall thickness of 150 µm, and 62 cells per 1 cm² of cross sectional area. This comparative example had no axial grooves and no outer coating at the outer periphery thereof. Similar performance tests were effected on this honeycomb structure, and the results of the tests are indicated in TABLE 3 below.

TABLE 1

|  |  | Average Particle Size (µm) | Solid Content (%) | Composition(% by weight)*² |  |  |  |  |  |
|---|---|---|---|---|---|---|---|---|---|
|  |  |  |  | MgO | Al₂O₃ | SiO₂ | CaO | Na₂O | ZrO₂ |
| Cordierite powder | A | 20 | — | 13.7 | 35.5 | 50.6 | 0.1 | 0.2 | — |
| Cordierite powder | B | 30 | — | 13.6 | 35.5 | 50.6 | 0.1 | 0.2 | — |
| Cordierite powder | C | 10 | — | 13.7 | 35.4 | 50.5 | 0.1 | 0.2 | — |
| Zirconium silicate powder |  | 10 | — | ≦0.1 | ≦0.1 | 32.8 | ≦0.1 | ≦0.1 | 67.2 |
| Ceramic fiber powder (amorphous mullite) | A | 10 | — | ≦0.1 | 72.0 | 28.0 | ≦0.1 | ≦0.1 | — |
| Ceramic fiber powder (amorphous silica alumina) | B | 10 | — | ≦0.1 | 48.0 | 52.0 | ≦0.1 | ≦0.1 | — |
| Inorganic binder (water glass) | A | — | 30 | ≦0.1 | ≦0.1 | 78.0 | 0.1 | 22.0 | — |
| Inorganic binder (alumina cement) | B | — | 100 | 0.4 | 73.2 | 0.8 | 25.4 | 0.2 | — |
| Inorganic binder (colloidal silica) | C | — | 40 | ≦0.1 | ≦0.1 | 98.0 | ≦0.1 | 2.0 | — |
| Inorganic binder (collidal alumina) | D | — | 30 | ≦0.1 | 99.0 | ≦0.1 | ≦0.1 | 0.3 | — |

*¹Measured by laser diffraction type particle size analyzer
*²Calculated in terms of oxides

TABLE 2

| Coating material No. | Cordierite powder A (parts by weight) | Inorganic binder (Parts by weight*¹) | | |
|---|---|---|---|---|
|  |  | A | B | C |
| 1 | 100 | 20 | — | — |
| 2 | 100 | — | 20 | — |
| 3 | 100 | — | — | 20 |
| 4 | 100 | — | — | 10 |
| 5 | 100 | — | — | 35 |

*¹Solid portion of inorganic binder

Subsequently, the coating materials as indicated in TABLE 2 were applied to the outer peripheries of the first

TABLE 3

| Outer periphery of honeycomb body | Coating material No. | Isostatic strength (Kg/cm$^2$) | Thermal shock resistance (°C.) | Crack forming temperature (°C.) | Vibration test result | Peel-off strength (Kg/cm$^2$) |
| --- | --- | --- | --- | --- | --- | --- |
| No coating*[1] | — | 6.0 | 850 | — | — | — |
| No grooves | 1 | 8.8 | ≦350 | ≦300 | Peeling of coating | 1.9 |
|  | 2 | 8.5 | ≦350 | ≦300 | Peeling of coating | 1.7 |
|  | 3 | 10.2 | 700 | 800 | Peeling of coating | 2.0 |
|  | 4 | 9.8 | 750 | 850 | Peeling of coating | 1.7 |
|  | 5 | 11.5 | 600 | 700 | Peeling of coating | 3.5 |
| Grooves | 1 | 30.7 | 400 | 325 | No peeling of coating | 6.2 |
|  | 2 | 27.6 | 400 | 350 | No peeling of coating | 6.0 |
|  | 3 | 38.4 | 725 | 850 | No peeling of coating | 6.5 |
|  | 4 | 36.7 | 800 | 900 | No peeling of coating | 5.0 |
|  | 5 | 40.0 | 650 | 800 | No peeling of coating | 8.3 |

*[1]Comparative Example

The isostatic strength was tested in the following manner, using four test specimens (i.e., honeycomb structures) for each item in TABLE 3. Initially, each test specimen was sealed with about 20 mm-thickness aluminum sheets applied to the upper and lower end faces of the specimen via about 0.5 mm-thickness urethane sheets, and with a 0.5 mm-thickness urethane sheet surrounding the outer circumferential surface of the specimen. Then, the specimen was put into a pressure vessel filled with water, and the pressure in the vessel was raised incrementally, until the noise of crack formation took place when the pressure was measured as the isostatic strength.

The thermal shock resistance and crack-forming temperature were measured in the following manner, using three test specimens (i.e., honeycomb structures) for each item in TABLE 3. The test results as indicated in TABLE 3 are of the average of the three test specimens. Initially, a honeycomb structure as a test specimen was disposed on a metal screen in a frame, heated in an electric furnace held at 700° C., and then took out of the furnace after one hour. Then, the appearance of the honeycomb structure was visually observed, and the outer wall of the structure was lightly tapped with a thin metal stick. If no crack was found as a result of the observation while the sound of metal was made upon tapping, the honeycomb structure was held out of the furnace for an hour and cooled down to the room temperature, and then reheated in the electric furnace held at a temperature which is 25° C. or 50° C. higher than the previous heating temperature. These steps were repeated until the honeycomb structure was broken. The breakage was detected when any crack was found or the tapping sound was dull. The thermal shock resistance as indicated in TABLE 3 is represented by the maximum temperature at which the honeycomb structure was not broken. In this test, if no crack was found in the outer coating when the honeycomb structure was broken, the above heating steps were repeated until any crack was found in the coating. In TABLE 3, the temperature of crack formation is represented by the heating temperature at which a crack was first found.

The peel-off strength was tested in the following manner. Initially, a test specimen of 30 mm-length honeycomb body was cut out of each honeycomb structure, which specimen is provided at one of its opposite end faces with an outer coating of 10 mm×10 mm. Then, metal sheets of 30 mm×30 mm×10 mm were bonded to the one end face (with the coating) and the other end face of the specimen, and were pulled away from each other until the coating was peeled off, and a pulling force upon peeling of the coating was measured as the peel-off strength. The vibration test was conducted by winding a wire mesh around the outer periphery of each honeycomb structure, canning or inserting the structure into a casing, and subjecting the canned structure to vibrations of 200 Hz at an acceleration of 20 G for 100 hours, to determine whether the outer coating was peeled off or not. The result of this test is also indicated in TABLE 3.

It will be understood from the above results that the isostatic strength is not significantly improved and the thermal shock resistance is considerably reduced when the outer coating is provided on the non-grooved honeycomb structures having an integral outer wall and distorted cells in its peripheral portion. This means that the outer coating formed on such honeycomb structures yields substantially no reinforcing effects. When the outer coating is provided on the honeycomb structures having no distorted cell portion but formed with axial grooves at its periphery, on the other hand, the isostatic strength is effectively improved, and the thermal shock resistance is not so much deteriorated as the non-grooved honeycomb structures, unless cracks are formed earlier in the outer coating than in the inner honeycombed portion. In these honeycomb structures as described just above, cracks are usually formed in the outer coating at a comparatively high temperature.

No significant improvement is achieved in the isostatic strength of the honeycomb structure having the distorted cell portion, even if the outer coating is provided on its periphery, since the structure is likely to be broken at its weakest portion which is, in this case, the distorted cell portion. On the other hand, the honeycomb structure with the axial grooves does not include such distorted cell portion, and can therefore be effectively reinforced by the outer coating.

With respect to the honeycomb structure having the non-grooved honeycomb body with the integral outer wall, the reduction of the thermal shock resistance and the low temperature of crack formation in the outer coating are considered to be related with the overall thickness of the outer wall of the structure and the area of contact between the coating and the honeycomb body. Namely, the thickness of the outer wall of the honeycomb structure is increased with the outer coating formed on the outer wall portion of the honeycomb body which is integral with the honeycombed body portion, whereby the tensile stress occuring in the outer wall is increased due to a difference in the coefficient of contraction between the honeycombed body portion and the outer wall of the structure. In the honeycomb structure having the honeycomb body with axial grooves, on the other hand, the outer wall of the structure does not include the outer wall portion of the honeycomb body but consists solely of the outer coating filling the grooves. Since the tensile stress occuring in the outer coating is absorbed by the partition walls defining the grooves, which receive the tensile strain as contraction stress acting thereon, the reduction of the thermal shock resistance can be prevented or alleviated. These phenomena have no relation with the presence of a distorted cell portion in the honeycomb body. While the isostatic strength may be increased by providing the outer coating on a non-grooved honeycomb body having an integrally formed outer wall portion and no distorted cell portion, the honeycomb structure still suffers from reduction in the thermal shock resistance and the low temperature of crack formation. This makes substantially no difference from the honeycomb structure having a non-grooved honeycomb body with an integrally formed outer wall portion and a distorted cell portion.

It will be also understood from the results of the peel-off strength and vibration tests that the honeycomb structure using the non-grooved honeycomb body exhibits a relatively low peel-off strength with respect to the outer coating formed on the honeycomb body, with a result of peeling of the coating in the vibration test. On the other hand, the honeycomb structure in which the outer coating is provided on the grooved honeycomb body exhibits a relatively high peel-off strength, causing no peeling of the coating in the vibration test. These results are associated with the contact area of the honeycomb body with the coating material for the outer coating. Namely, the grooved honeycomb body has a larger contact area with the coating material than the non-grooved honeycomb body, thereby assuring an increased bonding strength between the coating material and honeycomb body.

It will be apparent from the above description that the honeycomb structure with the grooves formed at its outer periphery and filled with the coating material has excellent characteristics, such as higher degrees of the isostatic strength and thermal shock resistance and no peeling of the outer coating from the honeycomb body, compared to the structure having a non-grooved honeycomb body. While the honeycomb structure having no outer coating has a poor isostatic strength and cannot be used as a catalyst support or for other practical use, the honeycomb structure of the present invention, which has the grooves and outer coating as described above, exhibits enhanced isostatic strength and thermal shock resistance, and can therefore be favorably employed in practical use.

EXAMPLE 2

Various coating materials Nos. 1–3 and 6–23 as indicated in TABLE 4 through TABLE 7 were prepared using the raw materials having properties as shown in TABLE 1, and the prepared material batches were mixed and kneaded with water, and formed into respective masses of paste adapted for coating on honeycomb bodies. Each of the coating materials was applied to the cordierite honeycomb body 12 with the axial grooves as shown in FIG. 3, exposed to the atmosphere for 24 hours, and then dried at 90° C. for two hours, to provide a cordierite honeycomb structure with the corresponding outer coating. The thus obtained honeycomb structures were evaluated in terms of the isostatic strength, thermal shock resistance and temperature of crack formation in the outer coating, and the results are indicated in TABLE 8.

TABLE 4

| Coating material | Cordierite powder A | Inorganic binder (parts by weight*1) | | | |
|---|---|---|---|---|---|
| No. | (parts by weight) | A | B | C | D |
| 1 | 100 | 20 | — | — | — |
| 2 | 100 | — | 20 | — | — |
| 3 | 100 | — | — | 20 | — |
| 6 | 100 | — | — | — | 20 |

*1Solid portion of inorganic binder

TABLE 5

| Coating material | Zirconium silicate powder (parts | Inorganic binder (parts by weight*1) | | | |
|---|---|---|---|---|---|
| No. | by weight) | A | B | C | D |
| 7 | 100 | 20 | — | — | — |
| 8 | 100 | — | 20 | — | — |
| 9 | 100 | — | — | 20 | — |
| 10 | 100 | — | — | — | 20 |

*1Solid portion of inorganic binder

TABLE 6

| Coating material | Cordierite powder (parts by weight) | | Inorganic binder (parts by weight*1) |
|---|---|---|---|
| No. | B | C | |
| 11 | 100 | — | 20 |
| 12 | — | 100 | 20 |
| 13 | 50 | 50 | 20 |
| 14 | 50 | 50 | 2 |
| 15 | 50 | 50 | 5 |
| 16 | 50 | 50 | 35 |
| 17 | 50 | 50 | 50 |

*1Solid portion of inorganic binder

TABLE 7

| Coating material | Cordierite powder A (parts by | Ceramic fiber powder (parts by weight) | | Inorganic binder (parts by weight*1) |
|---|---|---|---|---|
| No. | weight) | A | B | |
| 18 | 80 | 20 | — | 20 |
| 19 | 80 | — | 20 | 20 |
| 20 | 20 | 80 | — | 20 |
| 21 | 20 | — | 80 | 20 |
| 22 | — | 100 | — | 20 |
| 23 | — | — | 100 | 20 |

*1Solid portion of inorganic binder

TABLE 8

| Coating material No. | Isostatic strength (Kg/cm²) | Thermal shock resistance (°C.) | Crack forming temperature (°C.) |
| --- | --- | --- | --- |
| No coating | ≦1.0 | 925 | — |
| 1 | 7.0 | ≦600 | ≦600 |
| 2 | 6.7 | ≦600 | ≦600 |
| 3 | 7.8 | 850 | 950 |
| 6 | 7.0 | 875 | 950 |
| 7 | 7.4 | ≦600 | ≦600 |
| 8 | 6.8 | ≦600 | ≦600 |
| 9 | 8.4 | 650 | 700 |
| 10 | 7.2 | 675 | 700 |
| 11 | 7.6 | 850 | 950 |
| 12 | 7.8 | 850 | 950 |
| 13 | 9.5 | 850 | 950 |
| 14 | 3.2 | 925 | 1100 |
| 15 | 4.3 | 925 | 1100 |
| 16 | 10.0 | 850 | 950 |
| 17 | 12.0 | 750 | 800 |
| 18 | 7.9 | 850 | 1000 |
| 19 | 7.8 | 825 | 1000 |
| 20 | 7.8 | 850 | 950 |
| 21 | 8.0 | 850 | 1000 |
| 22 | 7.8 | 825 | 950 |
| 23 | 8.0 | 850 | 1000 |

It will be understood from the above tables that the honeycomb structure has a remarkably increased isostatic strength when a water glass or alumina cement is used as the inorganic binder of the outer coating while the structure has considerably high degrees of both of the isostatic strength and thermal shock resistance when colloidal silica or colloidal alumina is used as the inorganic binder. Accordingly, it is preferred to employ colloidal oxides, such as colloidal silica or colloidal alumina, as the inorganic binder of the outer coating, rather than water glass or alumina cement, so as to assure excellent properties of the resultant honeycomb structure provided with the outer coating.

Although the isostatic strength is more or less increased when the conventionally used zirconium silicate powder is used as the aggregate of the coating material, as compared with when a cordierite powder is used, the use of the cordierite powder leads to significant improvements in the thermal shock resistance and temperature of crack formation in the outer coating. Presumably, this is due to the higher coefficient of thermal expansion of cordierite than zirconium silicate. The increased isostatic strength is considered to be derived from the fact that the inorganic binder effectively acts on the zirconium silicate powder which has the lower porosity than the cordierite powder used in this example. If the porosity of the cordierite powder is lowered to be around that of the zirconium silicate powder, the use of either powder assures the same level of isostatic strength. Namely, when the material used as the aggregate has a relatively high porosity, the inorganic binder tends to intrude into the aggregate particles, making it difficult for the binder to effectively function to bond the particles together. Accordingly, it is preferable to use an aggregate, particularly cordierite particles, having a relatively low porosity.

Further, it is recognized that the cordierite powder used as the aggregate of the outer coating is preferably a mixture of minute particles (having the average particle size of 10 μm) and coarse particles (having the average particle size of 30 μm), since the use of such mixture leads to a higher isostatic strength as compared with when the cordierite powder consists solely of the minute particles, coarse particles, or intermediate particles (having the average particle size of 20 μm). This is because the cordierite particles having a two-step particle size distribution are closely packed together, thereby enabling the outer coating to effectively function as a reinforcing wall for the honeycomb body. It is also recognized that as the amount of the inorganic binder used in the outer coating increases, the isostatic strength of the resultant honeycomb structure is increased while the thermal shock resistance is deteriorated. Although the addition of a large amount of inorganic binder leads to an increased bonding strength between the honeycomb body and the outer coating, and an accordingly increased isostatic strength, the thermal stresses occur between the honeycomb body and the outer coating since the thermal expansion of an oxide matrix formed by drying the inorganic binder is larger than those of the cordierite particles and the honeycomb body, whereby the thermal shock resistance of the resulting honeycomb structure is deteriorated.

It is further recognized that the total amount or a part of the cordierite powder may be favorably replaced by ceramic fibers to provide the aggregate, assuring the same degrees of thermal shock resistance and isostatic strength as when only the cordierite powder is used as the aggregate. Further, the use of the ceramic fibers leads to a relatively high crack-forming temperature at which cracks are formed in the outer coating.

What is claimed is:

1. A ceramic honeycomb structure comprising:
   a ceramic honeycomb body having a matrix of partition walls forming a multiplicity of cells extending in an axial direction of the honeycomb body, a radially outermost array of said multiplicity of cells being open to an outside of the honeycomb body in radial directions thereof, to provide a plurality of grooves formed in an outer periphery of the honeycomb body so as to extend in said axial direction; and
   an outer coating which fills at least said grooves to cover said outer periphery of said ceramic honeycomb body, so as to provide an outer surface of the honeycomb structure, said outer coating comprising at least one material selected from the group consisting of: (i) cordierite particles and a matrix of an amorphous oxide for bonding the cordierite particles together, said cordierite particles having an average particle size not larger than 50 μm; and (ii) ceramic fibers and a matrix of an amorphous oxide for bonding the ceramic fibers together, said ceramic fibers having a fiber length of 10–15 μm and a fiber diameter of 2–3 μm, wherein said matrix of an amorphous oxide is formed from one of colloidal silica and colloidal alumina, and wherein said coating contains 3–35 parts by weight of said matrix of an amorphous oxide per 100 parts by weight of said cordierite particles and/or said ceramic fibers.

2. A ceramic honeycomb structure according to claim 1, wherein said outer coating comprises cordierite as a primary crystal phase.

3. A ceramic honeycomb structure according to claim 1, wherein said outer coating comprises said cordierite particles and said matrix of an amorphous oxide for bonding said cordierite particles together.

4. A ceramic honeycomb structure according to claim 3, wherein said outer coating further comprises said ceramic fibers, and said matrix of an amorphous oxide bonds said cordierite particles and said ceramic fibers together.

5. A ceramic honeycomb structure according to claim 4, wherein said ceramic fibers comprise one of amorphous mullite and amorphous silica alumina.

6. A ceramic honeycomb structure according to claim 1, wherein said cordierite particles include first particles having an average size of not larger than 15 μm, and second particles having an average size of not smaller than 30 μm.

7. A ceramic honeycomb structure according to claim 1, wherein said outer coating comprises said ceramic fibers and said matrix of an amorphous oxide for bonding said ceramic fibers together.

8. A ceramic honeycomb structure according to claim 7, wherein said ceramic fibers comprise one of amorphous mullite and amorphous silica alumina.

9. A ceramic honeycomb structure according to claim 1, which has an isostatic strength of at least 3 kg/cm$^2$, a thermal shock resistance of not lower than 700° C., and a crack-forming temperature of not lower than 800° C. at which cracks are formed in the honeycomb structure.

10. A ceramic honeycomb structure comprising:

a ceramic honeycomb body having a matrix of partition walls forming a multiplicity of cells extending in an axial direction of the honeycomb body, a radially outermost array of said multiplicity of cells being open to an outside of the honeycomb body in radial directions thereof, to provide a plurality of grooves formed in an outer periphery of the honeycomb body so as to extend in said axial direction; and an outer coating which fills at least said grooves to cover said outer periphery of said ceramic honeycomb body, so as to provide an outer surface of the honeycomb structure, said outer coating consisting essentially of cordierite particles and a matrix of an amorphous oxide for bonding the cordierite particles together, said cordierite particles having an average particle size not larger than 50 μm, wherein said matrix of an amorphous oxide is formed from one of colloidal silica and colloidal alumina, and wherein said coating contains 3–35 parts by weight of said matrix of an amorphous oxide per 100 parts by weight of said cordierite particles.

11. A ceramic honeycomb structure according to claim 10, wherein said cordierite particles include first particles having an average size not larger than 15 μm and second particles having an average size not smaller than 30 μm.

12. A ceramic honeycomb structure according to claim 10, which has an isostatic strength of at least 3 kg/cm$^2$, a thermal shock resistance of not lower than 700° C., and a crack-forming temperature of not lower than 800° C. at which cracks are formed in the honeycomb structure.

13. A ceramic honeycomb structure comprising:

a ceramic honeycomb body having a matrix of partition walls forming a multiplicity of cells extending in an axial direction of the honeycomb body, a radially outermost array of said multiplicity of cells being open to an outside of the honeycomb body in radial directions thereof, to provide a plurality of grooves formed in an outer periphery of the honeycomb body so as to extend in said axial direction; and an outer coating which fills at least said grooves to cover said outer periphery of said ceramic honeycomb body, so as to provide an outer surface of the honeycomb structure, said outer coating consisting essentially of ceramic fibers and a matrix of an amorphous oxide for bonding the ceramic fibers together, said ceramic fibers having a fiber length of 10–15 μm and a fiber diameter of 2–3 μm, said matrix of an amorphous oxide being formed from one of colloidal silica and colloidal alumina, and said outer coating containing 3–35 parts by weight of said matrix of an amorphous oxide per 100 parts by weight of said ceramic fibers.

\* \* \* \* \*